United States Patent
Smith

(10) Patent No.: US 6,723,821 B2
(45) Date of Patent: Apr. 20, 2004

(54) POLYUREA POLYMERS PREPARED FROM POLYAMINE EPOXIDE ADDUCT

(75) Inventor: Stuart B. Smith, Conyers, GA (US)

(73) Assignee: Hehr, International Inc., Los Angeles, CA (US)

( * ) Notice: Subject to any disclaimer, the term of this patent is extended or adjusted under 35 U.S.C. 154(b) by 0 days.

(21) Appl. No.: 10/078,591

(22) Filed: Feb. 19, 2002

(65) Prior Publication Data

US 2002/0183450 A1 Dec. 5, 2002

Related U.S. Application Data

(60) Provisional application No. 60/269,610, filed on Feb. 17, 2001.

(51) Int. Cl.$^7$ .............................................. C08G 18/50
(52) U.S. Cl. ............................. 528/62; 528/60; 528/61; 528/65; 528/111; 528/121; 528/124
(58) Field of Search ............................. 528/60, 61, 62, 528/65, 111, 121, 124

(56) References Cited

U.S. PATENT DOCUMENTS

| | | |
|---|---|---|
| 4,777,187 A | 10/1988 | Weber et al. |
| 4,940,770 A | 7/1990 | Speranza et al. |
| 5,124,426 A | 6/1992 | Primeaux, II et al. |
| 5,162,388 A | 11/1992 | Primeaux, II |
| 5,218,005 A | 6/1993 | Zimmerman et al. |
| 5,266,671 A | 11/1993 | Primeaux, II |
| 5,480,955 A | 1/1996 | Primeaux, II |
| 5,504,181 A | 4/1996 | Primeaux, II |
| 5,525,681 A | 6/1996 | Barron et al. |
| 5,616,677 A | 4/1997 | Primeaux, II et al. |
| 5,739,240 A | 4/1998 | Smith |
| 5,741,872 A | 4/1998 | Smith |
| 5,747,552 A | 5/1998 | Smith |
| 5,759,695 A | 6/1998 | Primeaux, II |
| 5,773,531 A | 6/1998 | Smith |
| 5,830,987 A | 11/1998 | Smith |
| 5,863,997 A | 1/1999 | Smith |
| 5,908,875 A | 6/1999 | Smith |
| 5,962,144 A | 10/1999 | Primeaux, II |
| 6,013,755 A | 1/2000 | Primeaux, II et al. |
| 6,031,046 A | 2/2000 | Smith |
| 6,037,385 A | 3/2000 | Smith |
| 6,114,402 A | 9/2000 | Smith |
| 6,277,939 B1 | 8/2001 | Smith |
| 6,437,078 B1 | 8/2002 | Smith |

OTHER PUBLICATIONS

U.S. patent application Ser. No. 09/526,761, Smith, filed Mar. 16, 2000.

Albemarle Corporation, May 2001, www.albemarle.com, Baton Rouge, Louisiana.

Huntsman Performance Chemicals, 1999, http://www.huntsman.com/performance_chemicals/index.cfm?PageID=870, Houston, Texas.

*Primary Examiner*—Robert Dawson
*Assistant Examiner*—D. E. Aylward
(74) *Attorney, Agent, or Firm*—Leslie Meyer-Leon, Esq.; IP Legal Strategies Group P.C.

(57) ABSTRACT

The invention features a polyamine epoxide adduct, prepared by admixing a source of epoxy group with a polyamine, and allowing the epoxy groups to react with the terminal amino groups of the polyamine so as to form the polyamine epoxy adduct. The polyamine epoxide adduct of the invention can be used as a component for preparing a polyurea polymer, thereby providing the resulting polyurea polymer with improved adhesiveness and greater chemical resistance to acidic conditions. Polyurea polymer coatings prepared from polyamine epoxide adducts demonstrate better chemical resistance and adhesion when applied to substrates than do conventionally prepared polyurea formulations.

23 Claims, No Drawings

POLYUREA POLYMERS PREPARED FROM POLYAMINE EPOXIDE ADDUCT

REFERENCE TO PRIOR APPLICATION

This application claims priority from U.S. Provisional Patent Application No. 60/269,610, filed Feb. 17, 2001.

BACKGROUND OF THE INVENTION

1. Field of the Invention

The invention relates to a polyamine epoxide adduct, useful, e.g., as a component in a polyurea coating formulation.

2. Background of the Invention

Sprayable polyurea elastomers are widely used as coating materials on various substrates such as metals, plastics, wood and concrete. Sprayable formulations of polyurea have the advantage of setting rapidly. Conventional polyurea sprays do not perform well in some environments, exhibiting poor elastomeric properties and poor chemical resistance when exposed to conditions of high acidity, or the presence of hydrocarbons such as xylene or toluene. Prior attempts to apply polyurea coatings to substrates in such environments have included using epoxy resins as primers, but unfortunately expoxy resins cure slowly and present bad odors.

It is thus an object of the invention to provide a polyurea polymer which exhibits good adhesive properties and chemical resistance, while preserving optimal set rates and flowability.

SUMMARY OF THE INVENTION

The invention features a polyamine epoxide adduct, characterized in that an epoxy group is added to the terminal amino groups of a polyamine. The polyamine epoxide adduct is prepared by admixing a source of epoxy group with a polyamine, and allowing the epoxy groups to react with the terminal amino groups of the polyamine so as to form the polyamine epoxy adduct. The terminal amino groups react with the epoxy ring to form an amine-alcohol linkage, or adduct.

The polyamine epoxide adduct of the invention can be used, e.g., as a component for preparing a polyurea polymer, thereby providing the resulting polyurea polymer with improved properties of adhesiveness and chemical resistance. Polyurea polymers prepared from polyamine epoxide adducts demonstrate better resistance to acid and to hydrocarbons, e.g., aromatic hydrocarbons, e.g., xylene and toluene. Furthermore, polyurea polymers prepared from polyamine epoxide adducts of the invention demonstrate improved adhesion to substrates than do conventionally prepared polyurea formulations, when applied alone or in the presence of an epoxy resin primer. Thus, polyurea polymer formulations of the invention are advantageously used as coating on substrates such as, without limitation, metal, steel, wood, plastic, and concrete.

Accordingly, in one aspect the invention features a polyamine epoxide adduct useful in preparing a polyurea polymer which has increased chemical resistance to, e.g., acids and hydrocarbons, and has improved adhesive properties for adhering to, for example, a substrate, e.g., a concrete, metal, e.g., steel, wood, or plastic substrate. Preferably, the polyamine is present in stoichiometric excess relative to the concentration of epoxy groups, so that the epoxy groups are reacted fully on the backbone of the polyamine.

The invention further features a method of preparing a polyamine epoxide adduct by admixing an epoxy group that is able to react with a terminal primary amine along with a polyamine hardener, under conditions in which the epoxy group is added to the amino-terminal ends of the polyamine backbone. Preferably, the concentration of polyamine stoichiometrically exceeds that of the epoxy groups, so that the epoxy groups are substantially consumed when reacting with the polyamine. Alternatively, or in addition, the method can include the further, optional, step of removing any remaining epoxy groups from the prepared polyamine epoxide adduct. Excess epoxy groups can be removed by methods known to those skilled in the art, such as, e.g., by vacuum.

Without limitation, the polyamine epoxide adduct of the invention can be used as a component for preparing a polyurea polymer, thereby providing the resulting polyurea polymer with improved properties of adhesiveness and of chemical resistance. The polyamine epoxide adduct is substituted for the polyamine in a conventional method of preparing a polyurea by mixing a polyamine with a polyisocyanate, preferably in the presence of an optional chain extender. Optionally, where the chain extender is itself a polyamine, the polyamine epoxide adduct can be used as a substitute for the chain extender. The polyamine epoxide adduct prepared by the method of the invention is substantially free of unincorporated epoxy groups, so there is no substantial level of epoxy groups present in the reaction mixture when forming the polyurea.

Accordingly, the invention further features a polyurea polymer formulation that includes a polyamine epoxide adduct, and a method of preparing a polyurea polymer formulation that is based on a polyamine epoxide adduct component. The method includes the steps of allowing a polyamine epoxide adduct to react with a polyisocyanate, under conditions suitable for forming a polyurea polymer.

In a related aspect, the invention features an apparatus that includes a substrate, block, or surface coated with a polymer coating based at least in part on a polyurea prepared from a polyamine epoxide adduct. Suitable substrates and surfaces are composed at least in part of, e.g., metal, steel, wood, plastic, or concrete. The invention also features a method for applying a polyurea polymer coating to a substrate or surface thereof, the method including the step of applying a polyurea polymer coating prepared from a polyamine epoxide adduct to the substrate.

DETAILED DESCRIPTION

A. Formation of Polyamine Epoxide Adduct

The polyamine epoxide adduct of the invention is formed by reacting a polyamine with an epoxy compound.

For example, in one embodiment, the polyamine starting material can be the polyamine Jeffamine® D-2000 (Huntsman Performance Chemicals, Houston, Tex.). An adduct is made by reacting the polyamine with an epoxy resin, such as a Bis "A" or Bis "F" epoxy resin. The epoxy is reacted fully on the Jeffamine® backbone. This adduct is then substituted for the polyamine hardening reagent when preparing polyurea, thereby producing a material with better chemical resistance and with better adhesiveness, than when using a conventional polyurea polymer.

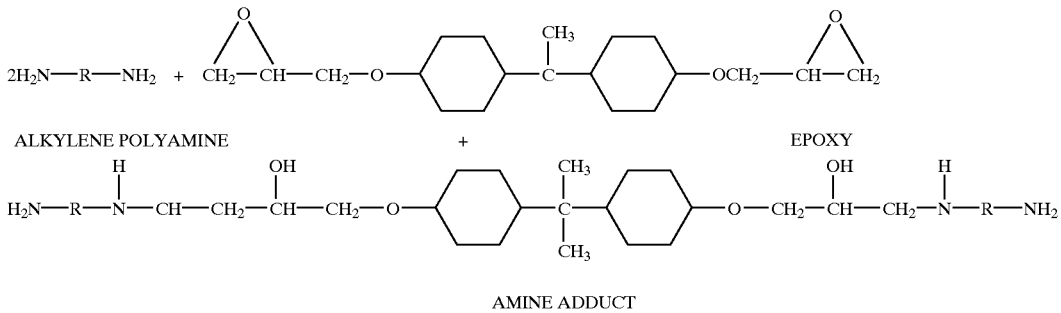

AMINE ADDUCT

Polyamine

Polyamine components useful in the practice of the present invention are generally those polyamines having two or more isocyanate reactive hydrogens per molecule. Preferably, all of the isocyanate reactive hydrogens of the polyamine are amine group hydrogens.

A suitable polyamine can be a monoamine, diamine, or triamine, and is preferably either a primary or secondary amine. Representative examples of such polyamines include, but are not limited to, ethylene diamine, 1,2-diaminopropane, 1,4-diaminobutane, 1,3-diaminopentane, 1,6-diaminohexane, 2,5-diamino-2,5-dimethlhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4' and/or 4,4'-diaminodicyclohexyl methane, and 3,3'-dialkyl-4,4'-diamino-dicyclohexyl methanes such as 3,3'-dimethyl-4,4'-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers). Mixtures of polyamines can be employed in preparing the polyamine epoxide adducts of the invention.

Examples of useful polyamines include alkylene polyamines represented by the formula:

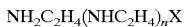

where X is —OH or —NH$_2$ and where n has the value of 0 to 5. When X is —NH$_2$, such alkylene polyamines include, for example, ethylene diamine, diethylene triamine, triethylene tetramine, tetraethylene pentamine, pentaethylene hexamine.

Aromatic amines can be used with the present invention as well. Examples of aromatic polyamines include 2,4 and 2,6-toluenediamine, n-aminoethylpiperazine, and m-phenylenediamine. Also useful with the present invention are, for example, diethyltoluenediamine and di-tert-butyl-toluenediamine.

Active amine hydrogen-containing materials useful in the present invention can be amine terminated polyethers. Preferably, amine terminated polyethers are selected from animated diols or triols, or a blend of animated diols or triols, or both. More preferably, the amine terminated polyethers are selected from mixtures of high molecular weight polyols, such as mixtures of difunctional and trifunctional materials. However, a single high molecular weight aminated polyurea can be used. Also, high molecular weight amine terminated alkylenes and simple alkyl amines are included within the scope of this invention, and may be used alone or in combination with the aforementioned amine terminated polyols. In addition, other amine terminated materials having different molecular weights or different chemical compositions may be used. The term "high molecular weight" is intended to include polyether amines having a molecular weight of at least about 1,500.

A particularly useful group of amines are amines derived from polyoxypropylene diols and triols. Preferably these diamines have the formula:

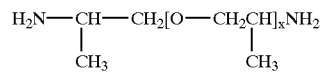

wherein x is an integer of from 2 to 40. The most preferred polyoxypropylene diamines have an average molecular weight of from 230 to 2,000. Particularly preferred are the JEFFAMINE® brand series of polyether amines available from Huntsman Corporation (Houston, Tex.). The JEFFAMINE® compounds are polyoxyalkyleneamines, and contain primary amino groups attached to the terminus of a polyether backbone. Suitable JEFFAMINE® polyoxyalkyleneamines are monoamine, diamine, or triamine. They include, e.g., JEFFAMINE® D-230, JEFFAMINE® D-400, JEFFAMINE® D-2000, JEFFAMINE® D-4000, JEFFAMINE® D-3000 and JEFFAMINE® T-5000.

In other embodiments, the invention can make use of BAC polyamines, such as ⅓ BAC, a cycloaliphatic amines, as well as isophorone diamine.

A polyamine epoxy adduct can also be prepared from a polyamine that is conventionally used as a chain extender, such as E-100 DEDTA (Albemarle Corp.), or a secondary aromatic amine such as Unilink 42.

Epoxy Component

Suitable epoxy resins which can be employed in the preparation of the polyamine epoxide adducts of the present invention are those that are known by those skilled in the polyurea art to be reactive with terminal amino groups.

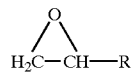

Preferably, the epoxy compound is derived from an epichlorohydrin compound and a polyol, such as an aromatic or aliphatic polyol, e.g., a bisphenol. More preferably, the epoxy compound is a Bisphenol A or Bisphenol F. In another embodiment, the epoxy compound can be an epoxy novolak or phenolic novalac.

B. Formation of Polyurea

Polyurea is formed by the reaction of an isocyanate and a primary amine, as shown by the following equation:

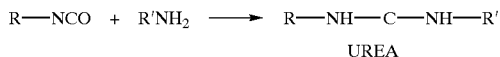

Sprayable polyurea elastomers are generally prepared by combining two streams, or sides of components. The first stream, or A side, includes an isocyanate. The second stream, or B side, includes a polyamine and, optionally, a chain extender such as diethyltoluene diamine (DETDA). The two reactive streams are directed into mutual contact with each other, so as to effectuate mixing of the first and second reactive streams. The mixed streams are applied, for example sprayed or poured, onto or into a substrate such as, for example, a concrete substrate. The isocyanate reacts with the polyamine to form a urea group. The chain extender improves the flowability of the polyurea elastomer, thereby permitting it to be sprayed.

Polyisocyanates

Polyisocyanate components of the present invention are well known in the polyurea art, and include organic polyisocyanates, modified polyisocyanates, isocyanate-based prepolymers, and mixtures thereof, as well as aliphatic and cycloaliphatic isocyanates and/or multifunctional and difunctional aromatic isocyanates. Preferred are 2,4- and 2,6-toluenediisocyanate (TDI) and the corresponding isomeric mixtures; 4,4'-, 2,4'- and 2,2'-diiphenylmethanediisocyanate (MDI) and the corresponding isomeric mixtures; mixtures of 4,4'-, 2,4'-and 2,2'-MDI and polyphenyl polymethylenea polyisocyanates (PMDI); and mixtures of PMDI and TDI.

Also useful for preparing the polyureas of the present invention are aliphatic and cycloaliphatic isocyanate compounds such as 1,6-hexamethylenediisocyanate; 1-isocyanato-3,5,5-trimethyl-1-3-isocyanatomethyl-cyclohexane; 2,4- and 2,6-hexahydrotoluenediisocyanate. The corresponding isomeric mixtures; 4,4'-, 2,2'- and 2,4'-dicyclohexylmethanediisocyanate, as well as the corresponding isomeric mixtures can also be used. Isophorone diisocyanate can also be used with the present invention.

Also advantageously used for the polyisocyanate component are the so-called modified multifunctional isocyanates, that is, products which are obtained through chemical reactions of the above polyisocyanates. Exemplary are polyisocyanates containing esters, ureas, biurets, allophanates and carbodiimides and/or uretonimines; urethane group containing diisocyanates or polyisocyanates. Polyisocyanates containing carbodiimide groups and/or uretonimine groups having an isocyanate group (NCO) content of from 10 to 40 weight percent, more preferably from 20 to 35 weight percent, can also be used. These include, for example, polyisocyanates based on 4,4'-, 2,4'- and/or 2,2'-MDI and the corresponding isomeric mixtures, 2,4- and/or 2,6-TDI and the corresponding isomeric mixtures; mixtures of MDI and PMDI and mixtures of TDI and PMDI and/or diphenylmethane diisocyanates.

Suitable and preferred are prepolymers having an NCO content of from 5 to 40 weight percent, more preferably from 15 to 30 weight percent. These prepolymers are prepared by reaction of the polyisocyanates with materials including lower molecular weight diols or triols, and can also be prepared with multivalent active hydrogen compounds such as di- and tri-amines and di- and tri-thiols. Individual examples are aromatic polyisocyanates containing urethane groups, preferably having an NCO content of from 5 to 40 weight percent, more preferably 10 to 35 weight percent, obtained by reaction of polyisocyanates with, for example, lower molecular weight diols, triols, oxyalkylene glycols, dioxyalkylene glycols or polyoxyalkylene glycols having molecular weights up to 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Even more preferred for use in the present invention are: (i) polyisocyanates having an NCO content of from 8 to 40 weight percent containing carbodiimide groups and/or urethane groups, from 4,4'-MDI or a mixture of 4,4'- and 2,4'-MDI; (ii) prepolymers containing NCO groups, having an NCO content of from 10 to 35 weight percent, based on the weight of the prepolymer, prepared by the reaction of polyoxy-alkylene polyols, having a functionality of preferably from 2 to 4 and a molecular weight of from 800 to 15,000 with 4,4'-diphenylmethane diisocyanate or with a mixture of 4,4'- and 2,4'-MDI and mixtures of (i) and (ii); and (iii) 2,4- and 2,6-TDI and the corresponding isomeric mixtures.

PMDI in any of its forms can also be used to prepare the polyureas of the present invention. In this case it preferably has an equivalent weight between 125 and 300, more preferably from 130 to 240, and an average functionality of greater than 2. More preferred is an average functionality of from 2.5 to 3.5. The viscosity of the polyisocyanate component is preferably from 25 (0.025 Pa.s) to 5,000 (5 Pa.s) centipoise, but values from 100 (0.100 Pa.s) to 2,000 (2 Pa.s) centipoise at 25.degree. C. are preferred for ease of processing. Similar viscosities are preferred where alternative polyisocyanate components are selected.

Control

As a control (hereafter referred to as the "control polyurea"), polyurea polymer was prepared using the following conventional formula for polyurea.

B side 25 pbw E-100 (Diethyl Toluene Diamine (DEDTA))
50 PBW D 2000 (Jeffamine ® D2000)
A side 16% MDI prepolymers plus
10% Propylene Carbonate
Ratio equals 1/1 PBV A/B Ratio equals 1/1 PBV A/B Generally, the A side stream includes an isocyanate prepolymer, such as MDI, and, optionally, propylene carbonate, which lowers the viscosity of the polyisocyanate. The B side generally includes a source of polyamine. The exemplified polyurea formula above includes two types of polyamines: Jeffamine® D2000 and E-100 DEDTA (Albemarle Co.).

Those skilled in the art routinely select appropriate combinations and types of polyamines to arrive at a desired set rate and flowability. For example, Jeffamine® D2000 enhances the hardness of the polyurea product, while increasing the amount of chain extender, e.g., E-100 DEDTA, results in a softer, less brittle formulation.

Processing temperatures are 150° F. with 2000-PSI spray pressure. This material is sprayed on with a Gusmer or GlasCraft spray machine.

Conventional formulations of polyurea typically have the following properties:

| | |
|---|---|
| Tensile Strength (PSI): | 2000–4000 |
| Shore Hardness: | 30A to 65D |
| % Elongation: | 1000 |
| % Tear Strength (P.L.I.): | 250–600 |
| 10% Modulus (PSI): | 500–2000 |

Typical Elcometer adhesion tests are the following-(ASTM D 4541)

| | |
|---|---|
| Concrete, dry: | 250–400 PSI |
| Concrete Primed with Epoxy: | 1000–1200 PSI |

EXAMPLE 1

A polyamine epoxide adduct was made by mixing 400 parts by weight (pbw) Jeffamine® D2000 with 100 pbw Bis A Epoxy. (Bis A epoxy: phenol-4,4,1 methyl ethyl lidne-lidene bis). The mixture was heated to 150° F. for one hour under agitation. After one hour, the temperature was brought to 200° F. for 20 minutes. A vacuum of 20" of Hg is pulled to remove any polyamines of low molecular weight.

A low viscosity polyamine epoxide adduct resulted which had an equivalent weight of 730.

EXAMPLE 2

A second polyamine epoxide adduct was made by combining 300 pbw E-100 DEDTA (diethyl Toluene Diamine) and 100 pbw Bis A Epoxy. The mixture was heated to 150° F. for one hour under agitation. After one hour, the temperature was brought to 200° F. for 20 minutes. A vacuum of 20" of Hg is pulled to remove any polyamines of low molecular weight.

The resulting polyamine epoxide adduct had an equivalent weight of 100.

EXAMPLE 3

A third polyamine epoxide adduct was produced using a hydrogenated meta xylene diamine which is called ⅓ BAC (Mitsubishi Chemical Corp.) 300 pbw of ⅓ BAC was mixed with 100 pbw of Bis A Epoxy and prepared as in Examples 1 and 2.

The resulting polyamine epoxide adduct had an equivalent weight of 100.

EXAMPLE 4

A fourth polyamine adduct was produced using 300 pbw Jeffamine® D-230, an aliphatic diamine of lower molecular weight than Jeffamine® D-2000, and combining it with 100 pbw Bis A Epoxy under the same conditions used in Example 3.

The resulting polyamine epoxide adduct had an equivalent weight of 100.

EXAMPLE 5

An E-100 DEDTA/Bis F Epoxy adduct was prepared as in Example 2, except that Bis F Epoxy was used in place of Bis A Epoxy. A Jeffamine® D2000/Bis F Epoxy adduct was prepared as in Example 1, except that Bis F Epoxy was used in place of Bis A Epoxy. A polyurea polymer was then prepared using these two resulting adducts as follows:

| | | |
|---|---|---|
| 25 PBW | E100/BIS F | B-side |
| 50 PBW | D2000/BIF F | |
| 70 PBW - MDI Prepolymer | | A-side |
| 10 PBW - PC (Propylene Carbonate) | | |
| Ratio 1/1 PBV | | |

EXAMPLE 6

Polyurea coatings were prepared from each of the polyamine epoxide adducts of Examples 1–4. Each coating was treated in an Elcometer adhesion pull test. The chart below indicates the Example No. corresponding to the particular polyamine epoxide adduct (col. 1), the polyurea components used (col. 2), and the corresponding Elcometer reading (col. 3).

| Example No. | | Polyurea Components | Elcometer (psi) |
|---|---|---|---|
| #1 | 25 | E100 | 600 psi |
| | 50 | 4/1 D2000/BIS A Epoxy | |
| | 70 | 15% MDI Prepolymer | |
| | 10 | Propylene Carbonate | |
| #2 | 25 | 3/1 E100/BIS A Epoxy | 800 psi |
| | 50 | <D2000 | |
| | 70 | MDI Prepolymer | |
| | 10 | Propylene Carbonate | |
| #3 | 20 | E100 | 1200 psi |
| | 5 | 1/3 BAC/Epoxy | |
| | 50 | D2000 | |
| | 70 | MDI Prepolymer | |
| #4 | 25 | E100/BIS A | 700 psi |
| | 50 | D2000/BIS A | |
| | 70 | MDI Prepolymer | |
| | 10 | PC Propylene Carbonate | |
| Control | 25 | E100 | 300 psi |
| | 50 | D2000 | |
| | 70 | MDI Prepolymer | |
| | 10 | Propylene Carbonate | |

EXAMPLE 7

The following chart shows the acid resistance of the polyurea polymer prepared according to Example 5, versus the control polyurea:

| | Polyurea Control | | Polyurea Epoxy *5 | |
|---|---|---|---|---|
| Acid Concentration | Initial Wt. | 72 Hrs. Soak | Initial Wt. | 72 Hrs. Soak |
| Sulfuric Acid 50% | 4.2 gm | 5.7 gm | 1.6 gm | 1.7 gm |
| Nitric Acid 50% | 3.2 gm | 3.8 gm | 2.3 gm | 2.5 gm |
| Hydrochloric Acid 50% | 2.5 gm | 3.3 gm | 2.3 gm | 2.5 gm |
| Acetic Acid 50% | 2.5 gm | 3.6 gm | 1.1 gm | 1.5 gm |

It can be clearly seen that the addition of epoxy into the chain of the polyurea does not affect spraying, and dramatically increases acid resistance and adhesion to concrete.

While the invention has been described above with respect to certain embodiments thereof, it will be appreciated that variations and modifications may be made without departing from the spirit and scope of the invention.

What is claimed is:

1. A method of, preparing a polyamine epoxide adduct comprising the steps of:
   a) admixing a polyamine and an epoxide under conditions in which the epoxy group is able to react with a terminal amino group; and
   b) allowing a terminal amino group of the polyamine to open an epoxy ring of the epoxide, thereby creating a polyamine with a terminal epoxide adduct as the polyamine epoxide adduct product, wherein the epoxide is a derivative of epichlorohydrin and Bisphenol F.

2. A method-of preparing a polyamine epoxide adduct, comprising the steps of:
   a) admixing a polyamine and an epoxy group under conditions in which the epoxy group is able to react with a terminal amino group; and
   b) allowing a terminal amino group of the polyamine to open the epoxy ring of the epoxide, thereby creating a polyamine with a terminal epoxide adduct as the polyamine epoxide adduct product, wherein the epoxide is a derivative of epichlorohydrin and an epoxy resin of phenolic novolak.

3. A method of preparing a polyamine epoxide adduct, comprising the steps of:
   a) admixing an aromatic polyamine and an epoxy group under conditions in which the epoxy group is able to react with a terminal amino group; and
   b) allowing a terminal amino group of the aromatic polyamine to open the epoxy ring of the epoxide, thereby creating a polyamine with a terminal epoxide adduct as the polyamine epoxide adduct product.

4. A method of preparing a polyamine epoxide adduct, comprising the steps of:
   a) admixing a polyamine and an epoxy group under conditions in which the epoxy group is able to react with a terminal amino group; and
   b) allowing a terminal amino group of the polyamine to open the epoxy ring of the epoxide, thereby creating a polyamine with a terminal epoxide adduct as the polyamine epoxide adduct product, wherein the polyamine is a cycloaliphatic amine.

5. A method of preparing a polyamine epoxide adduct,
   a) admixing polyamine and an epoxy group under conditions in which the epoxy group is able to react with a terminal amino group; and
   b) allowing a terminal amino group of the polyamine to open the epoxy ring of the epoxide, thereby creating a polyamine with a terminal epoxide adduct as the polyamine epoxide adduct product, wherein the polyamine is an isopherone diamine.

6. A method of preparing a polyamine epoxide adduct, comprising the steps of:
   a) admixing a polyamine and an epoxy group under conditions in which the epoxy group is able to react with a terminal amino group; and
   b) allowing a terminal amino group of the polyamine to open the epoxy ring of the epoxide, thereby creating a polyamine with a terminal epoxide adduct as the polyamine epoxide adduct product, wherein the concentration of polyamine is stoichiometrically in excess of the concentration of epoxy group.

7. A method of preparing a polyamine epoxide adduct, comprising the steps of:
   a) admixing a polyamine and an epoxy group under conditions in which the epoxy group is able to react with a terminal amino group;
   b) allowing a terminal amino group of the polyamine to open the epoxy ring of the epoxide, thereby creating a polyamine with a terminal epoxide adduct as the polyamine epoxide adduct product;
   c) removing residual epoxy group from the polyamine epoxide adduct product.

8. A polyamine epoxide adduct prepared by the method of any one of claim 1, 2, 3, and 4–7.

9. A method of preparing a polyurea polymer, comprising the steps of:
   (a) admixing the polyamine epoxide adduct of claim 8 with an isocyanate; and
   (b) allowing the polyamine epoxide adduct to react with the isocyanate so as to form a polyurea polymer.

10. A polyurea polymer prepared by the method of claim 9.

11. A method of coating a substrate, said substrate having a surface, comprising the steps of providing the polyurea polymer of claim 10, providing a source of said substrate, and applying the polyurea polymer to the surface of the substrate.

12. An apparatus prepared by the method of claim 11.

13. A method of preparing a polyurea polymer, comprising the steps of:
   (a) preparing a polyamine epoxide adduct by admixing a polyamine and an epoxide bearing an epoxy group under conditions in which the epoxy group is able to react with a terminal amino group, and allowing a terminal amino group of the polyamine to open the epoxy ring of the epoxide, thereby creating a polyamine with a terminal epoxide adduct as the polyamine epoxide adduct product;
   (b) admixing the polyamine epoxide adduct with an isocyanate; and
   (c) allowing the polyamine epoxide adduct to react with the isocyanate so as to form a polyurea polymer.

14. A polyurea polymer prepared by the method of claim 13.

15. A method of coating a substrate, said substrate having a surface, comprising the steps of providing the polyurea polymer of claim 14, providing a source of said substrate, and applying the polyurea polymer to the surface of the substrate.

16. An apparatus prepared by the method of claim 15.

17. The method of claim 13, wherein the epoxide is a bis epoxide.

18. The method of claim 17, wherein the epoxide is a derivative of epichlorohydrin and Bisphenol A.

19. The method of claim 13, wherein the polyamine is a diamine.

20. The method of claim 13, wherein the polyamine is an alkyleneamine.

21. The method of claim 20, wherein the polyamine is a polyoxyalkyleneamine.

22. The method of claim 21, wherein the polyoxyalkyleneamine is an amine-terminated polyethylene glycol.

23. The method of claim 21, wherein the polyoxyalkyleneamine is an amine-terminated polypropylene glycol.

* * * * *